Jan. 5, 1932.   J. F. O'CONNOR   1,840,125
FRICTION SHOCK ABSORBING MECHANISM
Filed Feb. 15, 1929
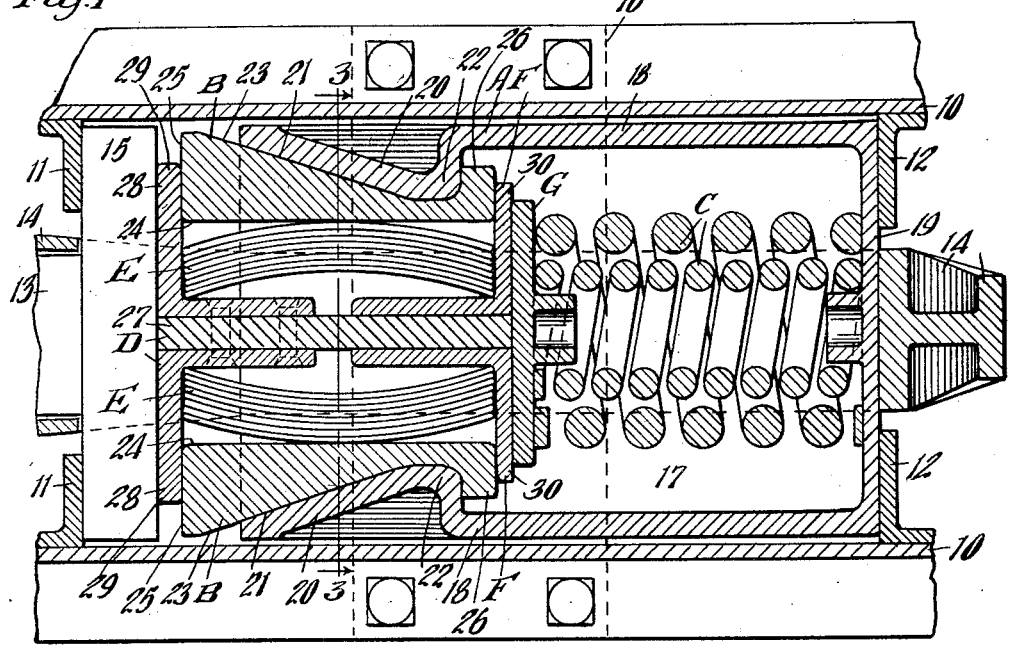
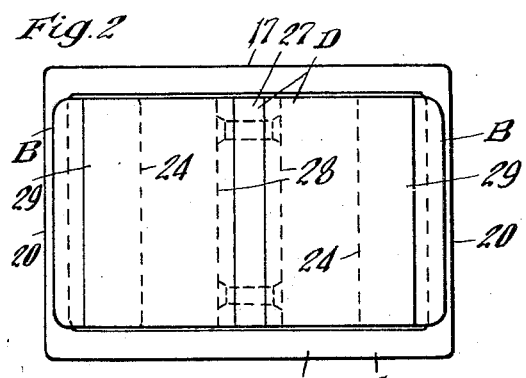
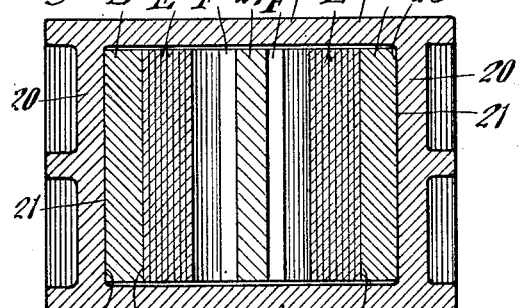
Witness
Wm. Geiger
Inventor
John F. O'Connor
By Joseph Harris
His Atty Patented Jan. 5, 1932

1,840,125

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed February 15, 1929. Serial No. 340,265.

This invention relates to improvements in friction shock absorbing mechanisms.

One object of the invention is to provide a friction shock absorbing mechanism especially adapted for railway draft riggings, including a casing having inwardly converging friction wedge surfaces at opposite sides thereof; a main follower movable toward and away from the casing, friction wedge blocks cooperating with the friction surfaces of the casing, a plurality of plate springs interposed between the blocks and yieldingly holding the same separated, and means interposed between the follower and blocks for shielding the follower against the outer raw ends of the plates, wherein the shielding means is held centered by the action of the spring plates to prevent accidental lateral displacement of the same.

Another object of the invention is to provide a friction shock absorbing mechanism including a casing having opposed interior inwardly converging friction surfaces, a pair of wedge friction blocks cooperating with the friction surfaces of the casing, plate spring means at opposite sides of the mechanism interposed between the wedge blocks and extending lengthwise of the mechanism, said plate springs being elongated when compressed, a pressure-transmitting member engaging the outer ends of the plates and blocks, the pressure-transmitting member including a post extending lengthwise of the mechanism and interposed between the plates of the spring means, friction shoes having sliding movement on the post to augment the resistance and having engagement with the plate springs and forced against the post thereby, said friction shoes being provided with abutment means cooperating with the inner ends of the plates of the spring means, whereby the shoes are forced inwardly of the mechanism upon elongation of the plate spring means, and a main spring resistance opposing inward movement of the shoes.

Other and further objects of the invention will more clearly appear from the description and claims hereinafter following.

In the drawings forming a part of this specification, Figure 1 is a horizontal, longitudinal sectional view of a portion of the underframe structure of a railway car, illustrating my improvements in connection therewith. Figure 2 is a front end elevational view of the shock absorbing mechanism proper illustrated in Figure 1. And Figure 3 is a vertical, transverse sectional view, corresponding substantially to the line 3—3 of Figure 1.

In said drawings, 10—10 indicate channel-shaped center or draft sills of a railway car underframe, to the inner sides of which are secured the usual front stop lugs 11—11 and rear stop lugs 12—12. The inner end of the coupler shank is designated by 13 and is operatively connected to a hooked yoke 14 of well known form.

My improved shock absorbing mechanism proper, together with the usual main follower 15, is disposed within the yoke and the yoke in turn is supported by a detachable saddle plate 16 secured to the bottom flanges of the draft sills.

My improved shock absorbing mechanism proper comprises, broadly, a casing A, a pair of friction wedge blocks B—B, a main spring resistance C, a combined friction post and pressure-transmitting member D, two laminated plate springs E—E, a pair of friction shoes F—F, and a spring follower G.

The casing A is in the form of a substantially rectangular box-like casting having spaced, longitudinally extending top and bottom walls 17—17, spaced, longitudinally extending vertical side walls 18—18, and a transverse rear end wall 19 cooperating with the stop lugs 12 in the manner of the usual rear follower. At the forward end the side walls of the casing are provided with inwardly converging portions 20—20 presenting longitudinally extending, inwardly converging, opposed flat friction surfaces 21—21. The inwardly converging wall portions 20 provide transverse shoulders 22 at the inner ends thereof, for a purpose hereinafter pointed out.

The friction wedge blocks B, which are two in number, are disposed at opposite sides of the mechanism, each block having a flat outer surface 23 correspondingly inclined to the surface 21 of the casing at the same side of the mechanism and engaging the same. On the inner side, each block is provided with a longitudinally extending flat face 24 adapted to form abutment means cooperating with the corresponding laminated plate spring E. At the front end, each block B has a flat transverse friction surface 25 for a purpose hereinafter pointed out.

At the inner end, each block B is provided with a lateral enlargement 26 which is adapted to engage with the transverse shoulder 22 at the same side of the casing to limit outward movement of the block and hold the same assembled with the remainder of the mechanism.

The combined pressure-transmitting member and friction post D comprises a plate-like section 27 disposed centrally of the mechanism and extending lengthwise of the same and a pair of angle plate members 28—28 secured to the front end of the plate 27. As shown, each of the angle plates 28 comprises a transverse section 29 forming a lateral flange of the post and a longitudinal section which is in contact with the coresponding side face of the post. As shown, the angle members 28 are secured to the post by rivets extending through the longitudinal portions of the angle plates. The transverse portions which form the flange-like members of the post 29 bear directly on the main follower 15 and have their inner surfaces in engagement with the front ends of the blocks B and function as friction means cooperating with the friction surfaces 25.

The friction shoes F, which are also two in number, are disposed at opposite sides of the post portion 27 of the member D. Each friction shoe comprises a plate-like portion having frictional engagement with the corresponding side surface of the post 27 and a laterally extending angular plate-like section 30 at the rear end thereof, normally engaging the inner end of the corresponding wedge block B.

The laminated plate springs E are arranged in pairs at opposite sides of the mechanism, each spring comprising a plurality of longitudinally curved rectangular spring plates which are nested together and have their opposite ends bearing on the flange 29 of the post and the flange 30 of the corresponding friction shoe F. The curved outer plate of each laminated spring bears directly on the flat inner face 24 of the corresponding wedge block B. The laminated plate springs E are preferably under initial compression so that the wedge blocks will be yieldingly held apart and the friction shoes F will have frictional contact with the opposite sides of the post 27. As will be evident, when the laminated plate springs E are laterally compressed, they will be elongated due to straightening out of the plates, thereby forcing the friction shoes F inwardly lengthwise of the post 27.

The main spring resistance C, which is disposed within the rear end of the casing, comprises a relatively light inner coil and a heavier outer coil having their rear ends bearing on the end wall 19 of the casing. The spring follower G is interposed between the front end of the spring resistance C and the flanges of the friction shoes F. In the normal position of the parts, the spring follower also directly bears on the inner end of the post 27. As will be seen upon reference to Figure 1, the flanges 30 of the friction shoes are of such a width that they engage in back of the wedge blocks B, thereby limiting outward movement of the shoes and also of the spring follower and limiting the expansion of the main spring resistance C.

The operation of my improved shock absorbing mechanism is as follows: During either a draft or buffing action, the main follower 15 and the casing A will be moved relatively inwardly toward each other. During the relative movement of the follower and casing, the combined pressure-transmitting member and post D will be forced inwardly carrying the friction wedge blocks B—B therewith. As the wedge blocks are forced inwardly along the converging surfaces 21 of the casing, the blocks will be forced to approach each other laterally while sliding on the friction surfaces 21. During this action, the laminated plate springs E will be compressed between the blocks B and the post 27, thereby forcing the friction shoes F more tightly against the friction surfaces of the post. During the compression of the laminated plate springs, the same will also be elongated, as hereinbefore pointed out, thereby forcing the shoes F inwardly lengthwise of the friction surfaces of the post 27 and compressing the main spring resistance C between the spring follower G and the end wall 19 of the casing. As will be evident, due to the pressure acting through the flanges 29 of the member D, the front ends of the blocks B will be forced into intimate contact with the inner surfaces of the flanges 29, thereby increasing the frictional resistance between these parts. During the lateral inward movement of the wedge blocks B, there will also be sliding movement of the end faces 25 thereof with respect to the flanges 29, thereby increasing the frictional resistance of the mechanism.

In addition to serving as the friction means, the flanges 29 of the member D also serve as means for shielding the main follower 15 from the front raw edge ends of the plate springs.

When the actuating force is reduced, the tendency of the main spring C to expand and the laminated plate springs to assume their normal curved condition, will effect restoration of all the parts to the normal full release position shown in Figure 1. The main spring resistance C will force the shoes F and the wedge blocks B outwardly until movement of the latter is arrested by engagement of the shoulders of the casing and the laminated plate springs will spread the wedge blocks B apart, thereby maintaining contact between the latter and the friction wedge surfaces 21 of the casing.

While I have herein shown and described what I consider the preferred manner of carrying out my invention, the same is merely illustrative and I contemplate all changes and modifications which come within the scope of the claims appended hereto.

I claim:

1. In a friction shock absorbing mechanism, the combination with a follower; of a casing having interior opposed, inwardly converging friction wedge surfaces, said follower and casing being relatively movable lengthwise of the mechanism; a pair of friction wedge blocks having friction wedge surfaces engaging the friction wedge surfaces of the casing; longitudinally disposed spring plates interposed between said blocks, said plates being arranged in two groups; a pressure-transmitting wear plate member interposed between the main follower and the outer ends of the spring plates and shoes; and means embraced between said groups of plates for maintaining the wear plate in centered position.

2. In a friction shock absorbing mechanism, the combination with a main follower; of a casing, said follower and casing being relatively movable toward and away from each other lengthwise of the mechanism; a friction wedge block movable inwardly and outwardly of the casing, said friction wedge block and casing having cooperating engaging surfaces inclined to the longitudinal axis of the mechanism; plate spring means urging the block against the inclined surface of the casing and yieldingly opposing lateral movement of the block; a shielding pressure-transmitting member interposed between the main follower and the raw ends of the spring plates; and means on the shielding member engaged with said plate spring means for opposing lateral movement of the shielding member.

3. In a friction shock absorbing mechanism, the combination with a casing having opposed interior friction wedge surfaces converging inwardly of the mechanism; of a central friction member having laterally extending outer flanges adapted to receive the actuating force; friction shoes at opposite sides of the post and having frictional engagement therewith; friction wedge blocks cooperating with the friction wedge surfaces of the casing, said blocks engaging the flanges of the post; plate spring means interposed between each block and the shoe at the corresponding side of the mechanism, said plate spring means being elongated upon lateral compression thereof and having engagement with the shoes to force the same rearwardly with respect to said blocks and post; and spring means opposing inward movement of the shoes.

4. In a friction shock absorbing mechanism, the combination with a casing having opposed interior, inwardly converging friction wedge surfaces; of friction wedge blocks cooperating with said surfaces; a friction post adapted to move inwardly in unison with the blocks; friction shoes cooperating with the post; spring resistance means interposed between the shoes and blocks opposing relative lateral approach of the blocks and pressing the shoes against the friction surfaces of the post, said springs being elongated upon lateral compression of the same; abutment means on the inner ends of the shoes engaging said springs and whereby the shoes are forced rearwardly along the friction surfaces of the post; and spring resistance means within the casing opposing inward movement of the friction shoes.

5. In a friction shock absorbing mechanism, the combination with a casing having opposed interior, inwardly converging flat surfaces; of a pair of wedge friction blocks cooperating respectively with said flat surfaces; a central post member having friction surfaces on opposite sides thereof, said post having laterally extending flanges at the outer ends engaging the outer ends of the blocks and the inner side of the usual main follower; friction shoes cooperating with the friction surfaces at opposite sides of the post, each of said shoes having a lateral flange engaging in back of the corresponding friction block; plate spring means interposed between each shoe and the block at the corresponding side of the mechanism, each plate spring means being curved lengthwise and having its opposite ends bearing on the flanges of the post and the shoe at the corresponding side of the mechanism, each wedge block being forced laterally inwardly toward the corresponding shoe during inward movement of the post and wedge blocks, thereby compressing said curved spring plate means and straightening the same, thereby forcing the shoes inwardly of the mechanism along the friction surfaces of the post, said wedge blocks, during lateral approach, having sliding frictional engagement with the flanges of the post; and a main spring resistance opposing inward movement of the shoes.

In witness that I claim the foregoing I have hereunto subscribed my name this 13th day of February, 1929.

JOHN F. O'CONNOR.